United States Patent Office

2,838,529
Patented June 10, 1958

2,838,529

13 - METHYL - 17 - HYDROXY-17-VINYL-1,2,3,6,7,8,-9,10,11,12,13,14,16,17 - TETRADECAHYDRO - 15H-CYCLOPENTA[a]PHENANTHREN-3-ONE

Frank B. Colton, Chicago, Ill., assignor, by mesne assignments, to G. D. Searle & Co., Skokie, Ill., a corporation of Delaware No Drawing. Application September 1, 1953
Serial No. 377,981

1 Claim. (Cl. 260—397.4)

The present invention relates to a new group of organic polycyclic compounds and, more particularly, to the 13-methyl-17-hydroxy-17-vinyl-1,2,3,6,7,8,9,10,11,12,-13,14,16,17 - tetradecahydro - 15H-cyclopenta[a]-phenanthren-3-one, which can be represented by the structural formula

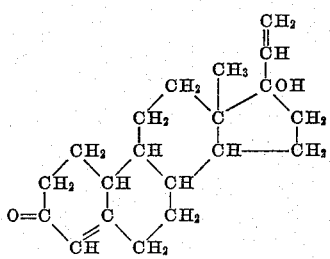

The foregoing compound is a valuable hormonal and cardiovascular agent. It is effective in compensating adrenocorticoid hormone imbalance and in the treatment of hypertension. The claimed compound is also valuable as an intermediate in the organic synthesis of further medicinally active compounds. This use is described in further detail in my copending application Serial No. 357,777, filed May 25, 1953 now U. S. Patent 2,704,768.

A convenient starting material for this compound is the 3 - methoxy-13-methyl-1,4,6,7,8,9,11,12,13,14,16,17-dodecahydro - 15H-cyclopenta[a]phenanthren - 17 - one described in my copending application, Serial No. 286,-611, filed May 7, 1952, now U. S. Patent 2,655,518, issued October 13, 1953, of which the present application is a continuation-in-part. Some of the procedures mentioned in that application have been somewhat modified in the experimental part below to indicate an alternate approach. The experimental part below illustrates a preferred procedure used in the practice of my invention and the compounds prepared thereby. However the invention is not to be construed as limited by the details set forth in spirit or in scope. It wil be apparent to those skilled in the art that many modifications in materials and methods may be practiced without departing from the invention. In each of these examples temperatures are given in degrees centigrade (° C.) and relative amounts of materials in parts by weight.

Example 1

To a solution of 51 parts of 17β-estradiol 3-methyl ether in 1800 parts of diethyl ether, there are added with stirring 1900 parts of liquid ammonia and then 50 parts of lithium wire in small pieces. Stirring is continued for an additional 15 minutes, after which 200 parts of absolute ethanol are added dropwise over a 20 minute interval. Upon disappearance of the blue color of the reaction mixture most of the ammonia is carefully removed on the steam bath after which water is added to decompose the reaction mixture. The aqueous layer is extracted with three 1400-part portions of ether and the combined ether layers are washed with water and dried over anhydrous sodium sulfate. The ether is removed in vacuo and the residue is crystallized from a mixture of ether and petroleum ether. Additional yield is obtained by concentration of the mother liquor and similar workup. The 3-methoxy-13-methyl-1,4,6,7,8,9,11,12,13,-14,16,17-dodecahydro - 15H - cyclopenta[a]phenanthren-17β-ol thus obtained melts at about 111–114° C.

A solution of 10 parts of this ether, 5 parts of aluminum isopropylate, and 83 parts of anhydrous cyclohexanone in 450 parts of toluene is heated at reflux temperature for 2.5 hours and then treated with water and 90 parts of a saturated Rochelle salt solution. The mixture is then steam distilled for 50 minutes during which time a solid separates which is collected on a filter, dried, and recrystallized from a mixture of ether and petroleum ether. The 3 - methoxy-13-methyl-1,4,6,7,8,9,11,12,13,-14,16,17-dodecahydro - 15H - cyclopenta[a]phenanthren-17-one thus obtained melts at about 131–133° C. It has the structural formula

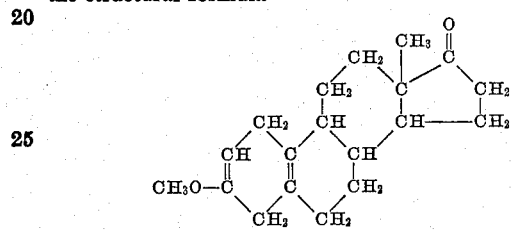

A solution of 12 parts of 3-methoxy-13-methyl-1,4,6,-7,8,9,11,12,13,14,16,17-dodecahydro - 15H - cyclopenta-[a]phenanthren-17-one in 260 parts of anhydrous toluene and 130 parts of ether is saturated with dry acetylene. While a slow stream of acetylene is passed through the reaction mixture, a solution of 12 parts of potassium tert. amylate in 260 parts of tertiary pentanol is added in the course of two hours with stirring. Passage of acetylene and stirring are continued for an additional 5 hours. The mixture is then washed with aqueous ammonium chloride solution until the aqueous phase is acid, then with water and with saturated aqueous sodium chloride solution. The organic layer is dried over anhydrous sodium sulfate, filtered and concentrated in vacuo to a residue of about 250 parts. 500 parts of petroleum ether are added and, after standing at 0° C. for an hour, the mixture is filtered. The collected precipitate is recrystallized from ether. The resulting 3-methoxy-13-methyl-17 - ethynyl-1,4,6,7,8,9,11,12,13,14,16,17 - dodecahydro-15H-cyclopenta[a]phenanthren-17-ol melts at about 181–182° C.

To a refluxing solution of 28.5 parts of this compound in 2800 parts of methanol and 1000 parts of water 240 parts of concentrated hydrochloric acid are added in the course of 2 minutes. Refluxing is continued for 4 minutes. After standing at room temperature for an hour, 4000 parts of water are added and the mixture is kept at 0° C. for several hours. The precipitated 13-methyl-17-hydroxy - 17 - ethynyl - 1,2,3,6,7,8,9,10,11,12,13,14,16,17-tetradecahydro - 15H - cyclopenta[a]phenanthren-3-one is collected on a filter, air dried and recrystallized from a mixture of ethyl acetate and petroleum ether. It melts at about 202–204° C.

A solution of 23.5 parts of this compound in 2500 parts of dioxane and 245 parts of pyridine is reduced in an atmosphere of hydrogen over 6 parts of a catalyst containing 5% palladium on calcium carbonate. The reduction is stopped on absorption of one molecule of hydrogen. The reaction mixture is filtered and the filtrate concentrated in vacuo. A solution of the residue in 2500 parts of ether is washed with normal hydrochloric acid, water and a saturated sodium chloride solution and dried over sodium sulfate. All but 200 parts of the ether are evaporated and the residue is treated with 800 parts of petroleum ether. After storage at 0° C. the precipitate is collected on a filter, air dried and recrystallized from a mixture of ethyl acetate and petroleum ether. The 13 - methyl - 17 - hydroxy - 17 - vinyl - 1,2,3,6,7,8,9,-10,11,12,13,14,16,17-tetradecahydro - 15H - cyclopenta-[a]phenanthren-3-one melts at about 169–171° C. It has the structural formula

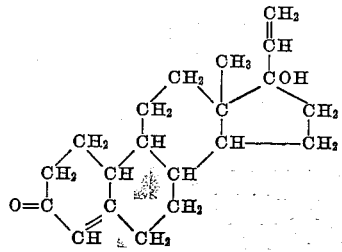

I claim:
The compound of the formula

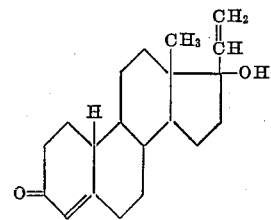

References Cited in the file of this patent
UNITED STATES PATENTS
2,272,131    Ruzicka _____ Feb. 3, 1942